(12) United States Patent
Rhee et al.

(10) Patent No.: US 12,294,116 B2
(45) Date of Patent: May 6, 2025

(54) BATTERY PACK

(71) Applicant: SK On Co., Ltd., Seoul (KR)

(72) Inventors: Seo Roh Rhee, Daejeon (KR); Ha Chul Jeong, Daejeon (KR); Yang Kyu Choi, Daejeon (KR)

(73) Assignee: SK ON CO., LTD., Seoul (KR)

( * ) Notice: Subject to any disclaimer, the term of this patent is extended or adjusted under 35 U.S.C. 154(b) by 41 days.

(21) Appl. No.: 17/562,869

(22) Filed: Dec. 27, 2021

(65) Prior Publication Data

US 2022/0209365 A1    Jun. 30, 2022

(30) Foreign Application Priority Data

Dec. 28, 2020  (KR) .................. 10-2020-0185133

(51) Int. Cl.
*H01M 50/505*    (2021.01)
*H01M 50/375*    (2021.01)

(52) U.S. Cl.
CPC ....... *H01M 50/505* (2021.01); *H01M 50/375* (2021.01)

(58) Field of Classification Search
CPC .. H01M 50/505; H01M 50/375; H01M 2/345; H01M 10/647; H01M 2/06
See application file for complete search history.

(56) References Cited

U.S. PATENT DOCUMENTS

| 4,920,446 A | * | 4/1990 | Pflanz | H01H 39/006 |
| | | | | 361/93.7 |
| 2016/0211611 A1 | * | 7/2016 | Cruz | H02H 3/08 |
| 2018/0226690 A1 | * | 8/2018 | Hwang | H02J 7/0029 |
| 2019/0372083 A1 | * | 12/2019 | Ryu | H01M 50/105 |
| 2020/0083512 A1 | * | 3/2020 | Son | H01M 10/0585 |
| 2020/0106075 A1 | * | 4/2020 | Yanagida | H01M 10/482 |

FOREIGN PATENT DOCUMENTS

| KR | 10-2018-0001341 A | 1/2018 |
| KR | 10-2019-0028200 A | 3/2019 |
| KR | 10-2020-0029871 A | 3/2020 |

* cited by examiner

*Primary Examiner* — Milton I Cano
*Assistant Examiner* — Albert Michael Hilton
(74) *Attorney, Agent, or Firm* — IP & T GROUP LLP (57) ABSTRACT

A battery pack includes a plurality of battery modules including a first battery module and a second battery module; and a busbar electrically connecting the first battery module and the second battery module, wherein the first battery module or the second battery module includes a vent hole in a portion corresponding to a portion of the busbar.

12 Claims, 5 Drawing Sheets

BATTERY PACK

CROSS-REFERENCE TO RELATED APPLICATION(S)

This application claims benefit of priority to Korean Patent Application No. 10-2020-0185133 filed on Dec. 28, 2020 in the Korean Intellectual Property Office, the disclosure of which is incorporated herein by reference in its entirety.

BACKGROUND

1. Field

The present disclosure relates to a battery pack including a plurality of battery modules.

2. Description of Related Art

As technological development of and demand for mobile devices, electric vehicles, and energy storage systems (ESS) increase, demand for secondary batteries as energy sources is rapidly increasing.

A battery cell commonly includes an electrode assembly such as an anode, a cathode, a separator and an electrolyte, which are main components of the secondary battery, and a cell body member of a laminated film case protecting the electrode assembly. A battery module composed of a plurality of battery cells may be mounted on an electric vehicle, or the like. The battery module includes a frame protecting the battery cells from external shocks, heat, and vibrations.

A battery cell may be overheated while charging and discharging electricity, and such overheating may deteriorate the performance of the battery cell and in some instance may cause a thermal runway in the battery cell and the battery module including the battery cell.

In a battery pack having multiple battery modules, when thermal runaway occurs in any one battery module, when components such as an insulating member (e.g., plastic, coating) maintaining an insulating function between the battery cell, the battery module, and the battery pack do not function properly, an overcurrent may flow between the battery module and the adjacent battery module. This soon leads to fire propagation between the battery modules, leading to risk of damage to all battery modules.

SUMMARY

An aspect of the present disclosure is to provide a means for protecting a battery module even in the event of a situation such as overheating, short-circuiting, or the like, or even in a thermal runway situation.

An aspect of the present disclosure is to provide a means for preventing fire propagation to other battery modules, even in a thermal runway situation of a specific battery module.

According to an aspect of the present disclosure, a battery pack may include: a plurality of battery modules including a first battery module and a second battery module; and a busbar electrically connecting the first battery module and the second battery module, wherein the first battery module and/or the second battery module may include a vent hole to a portion of the busbar.

In an embodiment, the busbar may include a disconnecting portion in a portion facing the vent hole, and the disconnecting portion may include a disconnecting portion having a smaller cross-sectional area than other portions of the busbar.

In an embodiment, the busbar may include a disconnecting portion in a portion facing the vent hole, and the disconnecting portion may include a disconnecting portion provided to have a greater resistance that other portions of the busbar.

In an embodiment, the busbar may include a disconnecting portion in a portion facing the vent hole, and the disconnecting portion may include a disconnecting portion having lower structural rigidity than other portions of the.

In an embodiment, the disconnecting portion may include a plurality of bridges connecting both ends of the disconnecting portion to the busbar.

In an embodiment, the busbar may include a deformation portion selectively connecting at least one end of the busbar by being deformed by gas discharged from the vent hole.

In an embodiment, the busbar may include a first portion connected to the first battery module, and a second portion connected to the second battery module, and one end of the deformation portion may be fixedly provided to the first portion, and the other end of the deformation portion may be selectively connected to the second portion by the gas of the vent hole.

In an embodiment, the deformation portion may include bimetal.

In an embodiment, an initiator mounted on a portion of the busbar and provided to break the busbar in response to the gas discharged from the vent hole may be further included.

In an embodiment, a trigger device positioned opposite to the vent hole, and detecting the gas discharged from the vent hole to rupture the initiator may be further included.

In an embodiment, the busbar may include a disconnecting portion in a portion close to the initiator, and the disconnecting portion may include a portion having lower structural rigidity than other portions of the busbar.

In an embodiment, a case for accommodating a portion of the initiator and the busbar may be further included.

According to the other aspect of the present disclosure, a battery pack may include: a plurality of battery module, each including at least one venting hole for venting gas in the case of a thermal runway to an outside of the battery module; and a busbar electrically connecting the plurality of the battery modules, wherein the busbar includes a plurality of disconnecting parts corresponding to the plurality of venting holes, and wherein each disconnecting part is positioned to face a corresponding venting hole.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other manners (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various manners as will be apparent after gaining an understanding of the disclosure of this application. Further, although the examples described herein have a variety of configurations, other configurations are possible as will be apparent after gaining an understanding of the disclosure of this application.

The drawings may not be to scale, and the relative sizes, proportions, and depiction of elements in the drawings may be exaggerated for clarity, illustration, and convenience.

Hereinafter, embodiments of the present disclosure will be described with reference to various examples. However, embodiments of the present disclosure may be modified to have various other forms, and the scope of the present disclosure is not limited to the embodiments described below.

Figure 1:
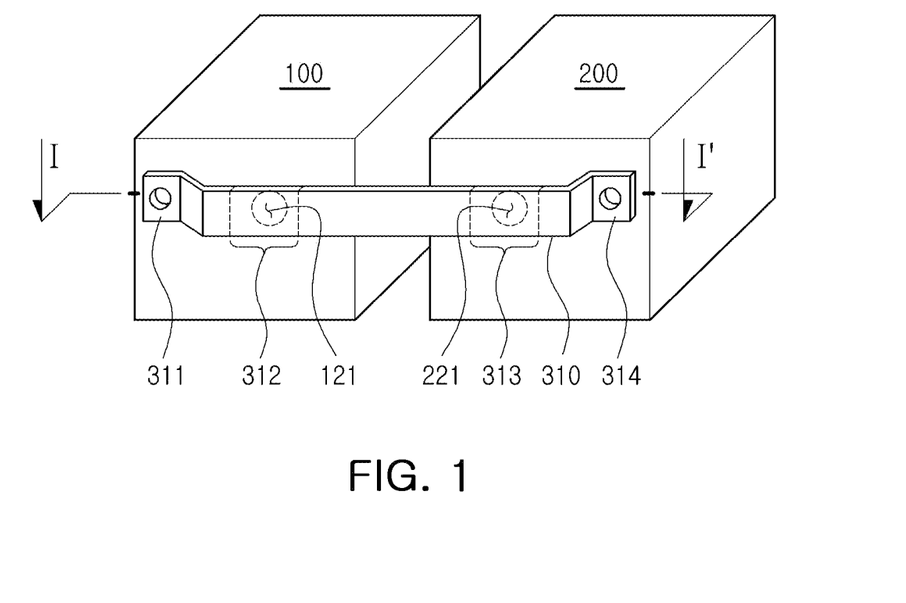
FIG. 1 illustrates an electrical connection between two battery modules in an embodiment.
Figure 2:
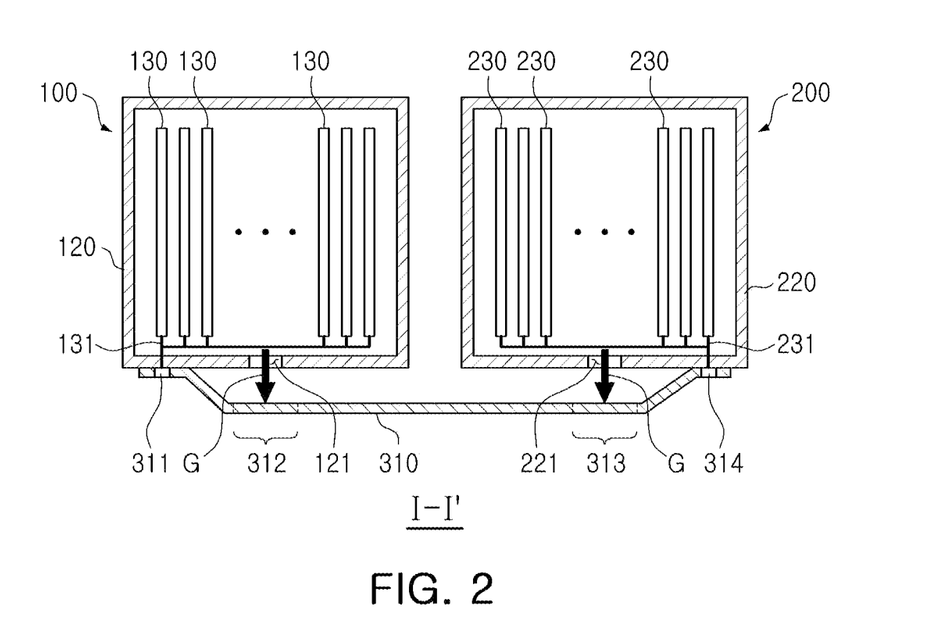
FIG. 2 is a cross-sectional view taken along line I-I' of FIG. 1.

FIG. 1 illustrates an electrical connection between two battery modules in an embodiment, and FIG. 2 is a cross-sectional view taken along line I-I' of FIG. 1.

Referring to FIGS. 1 and 2, battery modules 100 and 200 may be electrically connected by a busbar 310.

The battery modules 100 and 200 may include battery cases 120 and 220, and battery cells 130 and 230 provided inside the cases 120 and 220. The battery cells 130 and 230 may include an electrode assembly and a cell body member surrounding the electrode assembly. The electrode assembly is used by being accommodated in the cell body member while substantially including the electrolyte. The electrolyte may include a lithium salt such as $LiPF_6$, $LiBF_4$ in an organic solvent such as ethylene carbonate (EC), propylene carbonate (PC), diethyl carbonate (DEC), ethyl methyl carbonate (EMC), or dimethyl carbonate (DMC). Furthermore, the electrolyte may be in liquid, solid or gel state. The cell body member may be configured to protect the electrode assembly, and to receive an electrolyte. For example, the cell body member may be provided as a pouch-type member or a can-type member.

Anodes or cathodes of the battery cells 130 and 230 may be connected to a busbar 310 through electrical paths 131 and 231. For example, the busbar 310 may include a first terminal portion 311 and a second terminal portion 314. The terminal portions 311 and 314 may be electrically connected to the first battery module 100 and the second battery module 200, respectively. For example, the first terminal portion 311 may be connected to an anode of the first battery module 100, and the second terminal portion 314 may be connected to a cathode of the second battery module 200. As another example, the first terminal portion 311 may be connected to a cathode of the first battery module 100, and the second terminal portion 314 may be connected to an anode of the second battery module 200. The busbar 310 may include hole in the first terminal portion 311 and the second terminal portion 314. Each of the battery modules 100 and 200 may include a terminal that can be inserted into the hole of the busbar 310 in the battery cases 120 and 220.

In FIGS. 1 and 2, one busbar 310 responsible for an electrical connection between the two battery modules 100 and 200 is illustrated, but this is for convenience of description, other busbars may be further connected to one battery module 100 or 200. For example, the first battery module 100 may be electrically connected to a separate battery module, which is not illustrated, through a busbar.

In an embodiment, the battery modules 100 and 200 may include vent holes 121 and 221 positioned on the side of the battery modules 100 and 200 adjacent to the busbar 310, the vent holes 121 and 221 being open toward the busbar 310. Gas G generated when the battery cells 130 and 230 ignite may be discharged externally of the battery module through the vent holes 121 and 221 provided in the cases 120 and 220. During thermal runaway, not only gas G but also flame, oil, and particles may be discharged through the vent holes 121 and 221. In the present disclosure, the venting gas G may be understood as a concept including all flames, particles, and the like, discharged toward the busbar 310 from the vent holes 121 and 221 during a thermal runaway.

In the illustrated embodiment of FIG. 2, the vent holes 121 and 221 are provided so that the venting gas G is ejected toward the busbar 310. The vent holes 121 and 221 may be provided to face at least a portion of the busbar 310. A portion of the busbar 310 may be broken by high pressure and a high temperature of the venting gas G discharged from the vent holes 121 and 221, which will in turn disrupt the electrical connection between the battery modules 100 and 200. Accordingly, even if thermal runaway occurs in one battery module 100 and/or 200, transfer of the thermal runway to another battery module may be blocked by disrupting the electrical connection between the two modules 100 and 200 formed by the busbar 310. For example, the electrical disconnection between the two battery modules 100 and 200 may terminate the operation of the first battery module 100 or the second battery module 200, thus preventing the spread of the thermal runway to the first battery module 100 or second battery module 200.

In an embodiment, the busbar 310 may include disconnecting portions 312 and 313 positioned in a portion of the busbar 310 corresponding to the vent holes 121 and 221 of the battery modules 100 and 200. The disconnecting portions 312 and 313 may be facing the respective vent holes 121 and 221. The disconnecting portions 312 and 31 may be configured to be sufficiently damaged or deformed by the venting gas G discharged from the vent holes 121 and 221 for blocking the electrical connection between the first terminal portion 311 and the second terminal portion 314 of the busbar 310.

For example, the disconnecting portions 312 and 313 may be provided to have lower structural rigidity than other portions and may be broken by the venting gas G. For another example, the disconnecting portions 312 and 313 may be thermally deformed by the venting gas G causing the release of the electrical connections between both ends of the first terminal portion 311 and the second terminal portion 314. Meanwhile, in the present disclosure, fracturing or breaking of the disconnecting portions 312 and 313 may be understood as a concept including both the disconnecting portions 312 and 313 being physically broken but also the disconnecting portions 312 and 313 being deformed so that the electrical connection between the first terminal portion 311 and the second terminal portion 314 is not realized.

In an embodiment, the busbar 310 connecting the two battery modules 100 and 200 may include disconnecting portions 312 and 313 in two portions thereof. When a thermal runaway occurs in the first battery module 100, the first disconnecting portion 312 may be fractured to prevent the thermal runway to be transferred to the second battery module 200. When a thermal runaway occurs in the second battery module 200, the second disconnecting portion 313 may be fractured to prevent the thermal runway to be transferred to the first battery module 200.

In the illustrated embodiment, the vent holes 121 and 221 and the busbar 310 may be provided on side surfaces of the battery modules 100 and 200, but in another embodiment, the vent holes 121 and 221 and the busbar 310 may be provided on an upper surface or a lower surface of the battery modules 100 and 200.

In the illustrated embodiment, the busbar 310 is in close contact with the battery modules 100 and 200 in the terminal portions 311 and 314, and other portions (e.g., the disconnecting portions 312 and 313) are spaced apart from the battery module 100 and 200, but this is merely an example. For example, the busbar 310 may be provided in a form of a bar that is not substantially bent. For example, it may be a bar that is substantially flat, so that when the busbar 310 is assembled to the battery modules 100 and 200, the disconnecting portions 312 and 313 may be in close contact with the vent holes 121 and 221 of the battery module.

FIGS. 3A to 3E illustrate examples of disconnecting portions 312 and 313 of the busbar 310.

Figure 3A:
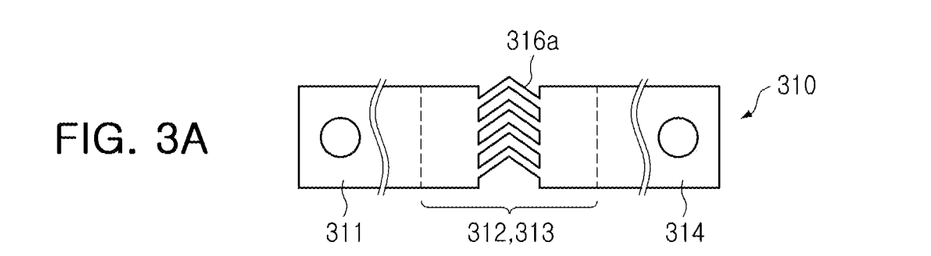
FIGS. 3A to 3E illustrate examples of a disconnecting portion of a busbar according to embodiments of the present invention.
Figure 3B:
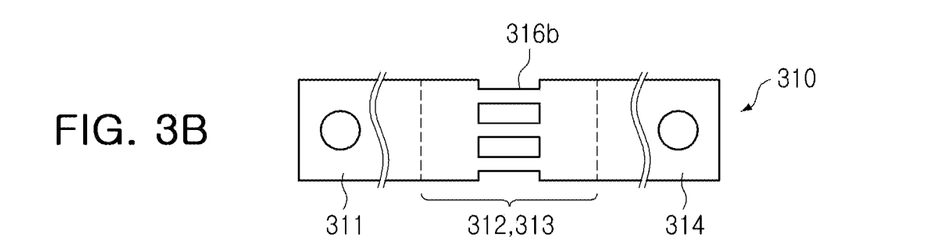

Referring to FIGS. 3A to 3E, the disconnecting portions 312 and 313 of the busbar 310 may have various shapes. For example, in FIG. 1, the first disconnecting portion 312 may have a shape as shown in FIG. 3A, and the second disconnecting portion 313 may have a shape as shown in FIG. 3B. For another example, each of the disconnecting portions 512 illustrated in FIG. 5 may have any one of the forms illustrated in FIGS. 3A to 3E.

The disconnecting portions 312 and 313 may be provided to be easily melted or broken by the venting gas G. In an embodiment, the disconnecting portions 312 and 313 may have a structure that is more vulnerable to heat, pressure, or impact than other portions. For example, a cross-sectional area of the disconnecting portions 312 and 313 may be provided to be smaller than a cross-sectional area of other portions. For example, when the busbar 310 has a certain thickness, a width of the disconnecting portions 312 and 313 may be narrower than that of other portions.

In an embodiment, the disconnecting portions 312 and 313 may be provided to have a higher resistance than other portions. For example, the disconnecting portions 312 and 313 may have a smaller cross-sectional area than other portions. When the disconnecting portions 312 and 313 have a high resistance, when a current of a certain size or more flows through the disconnecting portions 312 and 313, the disconnecting portions 312 and 313 may be heated and can be easily fused compared to other portions. This may prevent a situation in which the battery module (the battery modules 100 and 200 of FIG. 1, or the battery module 400 of FIG. 5) is overcharged.

In an embodiment, the busbar 310 may include disconnecting portions 312 and 313 in a portion facing the vent holes 121 and 221, and the disconnecting portions 312 and 313 may have lower structural rigidity than other portions of the busbar 310 extending from an end portion thereof.

Additionally, or alternatively, the disconnecting portions 312 and 313 may be provided to have a higher resistance than other portions. The disconnecting portions 312 and 313 may be relatively easily broken to block the electrical connection between the battery modules 100 and 200 when an overcurrent flows.

FIGS. 3A to 3E illustrate various examples of the disconnecting portions 312 and 313 having a weaker structure or a higher resistance value than other portions.

Figure 3C:
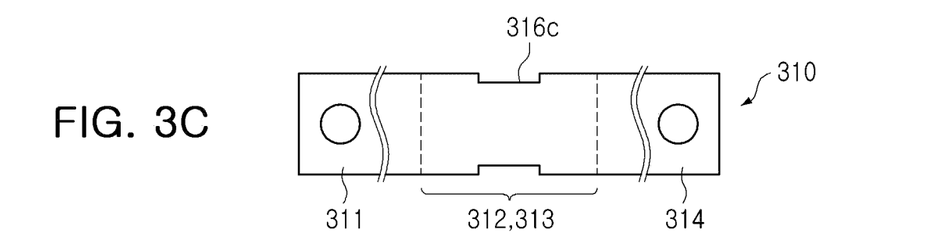
Figure 3D:
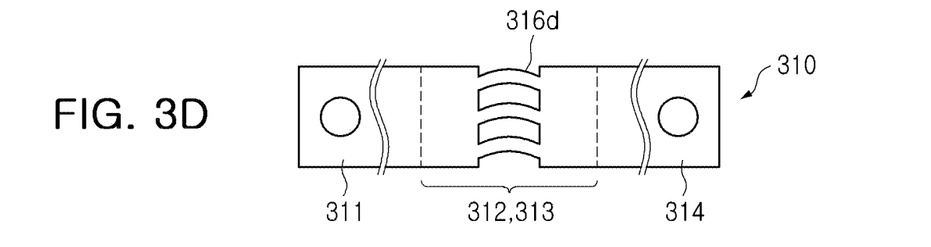
Figure 3E:
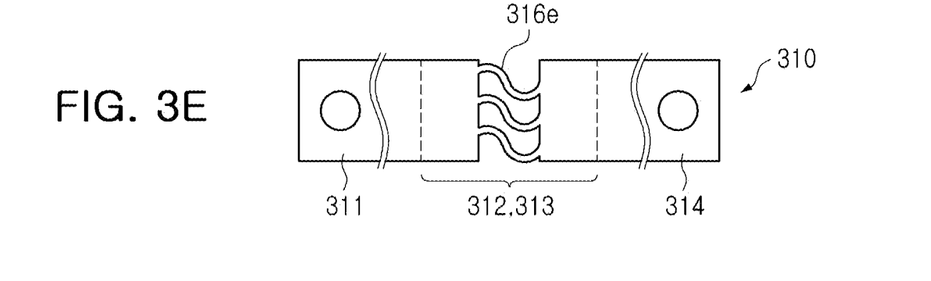

Referring to FIG. 3A, the disconnecting portions 312 and 313 may include a plurality of inverted V-shape bridges 316a connecting both ends of the disconnecting portions 312 and 313 and having a shape of being bent upwardly. Referring to FIG. 3B, the disconnecting portions 312 and 313 may include straight, and flat bridges 316b connecting both ends. Referring to FIG. 3C, the disconnecting portions 312 and 313 may include a portion 316c having a narrower width (or smaller cross-sectional area) than other portions. Referring to FIG. 3D, the disconnecting portions 312 and 313 may include a plurality of bridges 316d connecting both ends of the disconnecting portions 312 and 313 and having an arc shape. Referring to FIG. 3E, the disconnecting portions 312 and 313 may include a plurality of bridges 316e connecting both ends and having a wave shape.

In FIGS. 3A, 3B, 3D, and 3E, three bridges 316a, 316b, 316d, and 316e constitute the disconnecting portions 312 and 313, but in another embodiment, the disconnecting portions 312 and 313 may include four or more bridges.

The shapes of the various disconnecting portions 312 and 313 illustrated in FIG. 3 are merely examples and not limited thereto. In other embodiments, the disconnecting portions 312 and 313 may be provided to have a structure which is more vulnerable to break at high temperature, high pressure, or impact than other portions.

Figure 4:
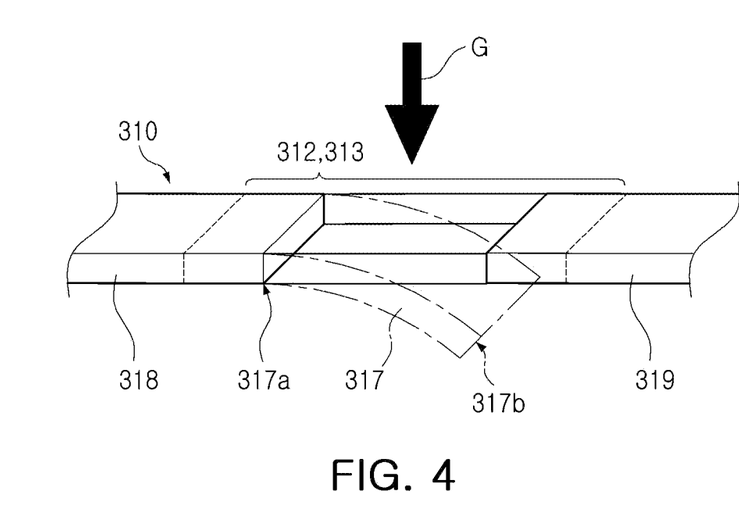
FIG. 4 is a view illustrating another form of a disconnecting portion of a busbar according to another embodiment of the present invention.

FIG. 4 illustrates another form of disconnecting portions 312 and 313 of the busbar 310 according to an embodiment of the present invention.

Referring to FIG. 4, the disconnecting portions 312 and 313 may alternatively be implemented in a switch manner. The disconnecting portions 312 and 313 may include a deformation portion 317 provided so that an end portion 317b selectively contacts a portion 319 of the busbar 310 located on one side of the disconnecting portions 312 and 313.

In an embodiment, the busbar 310 may include a first portion 318 connected to the first battery module 100, and a second portion 319 connected to the second battery module 200, and one end 317a of the deformation portion 317 may be fixedly provided to the first portion 318. The other end 317b of the deformation portion 317 may have a weaker connection to the second portion 319 so that it may be disconnected from the second portion 319 by the venting gas G exiting from the vent holes 121 and 221.

In an embodiment, the deformation portion 317 may include a bimetal selectively connecting both ends of the disconnecting portion 312 and 313. The bimetal may be a rod-shaped component made by welding two types of thin metal plates with different thermal expansion coefficients on top of each other. In a normal environment, the deformation portion 317 electrically connects both ends of the disconnecting portions 312 and 313. As a high-temperature venting gas G heats the deformation portion 317, the deformation portion 317 is bent to one side, which may release an electrical connection between both ends of the busbar 310.

In an embodiment, the disconnecting portions 312 and 313 may be provided to block the electrical connection of both ends of the disconnecting portions 312 and 313 by using thermal deformation of metal by the venting gas G in addition to the bimetal. In an embodiment, the disconnecting portions 312 and 313 may include a phase change material (PCM) that may change, for example, from a solid phase to a liquid phase thus breaking the busbar 314 into two separate parts.

Figure 5:
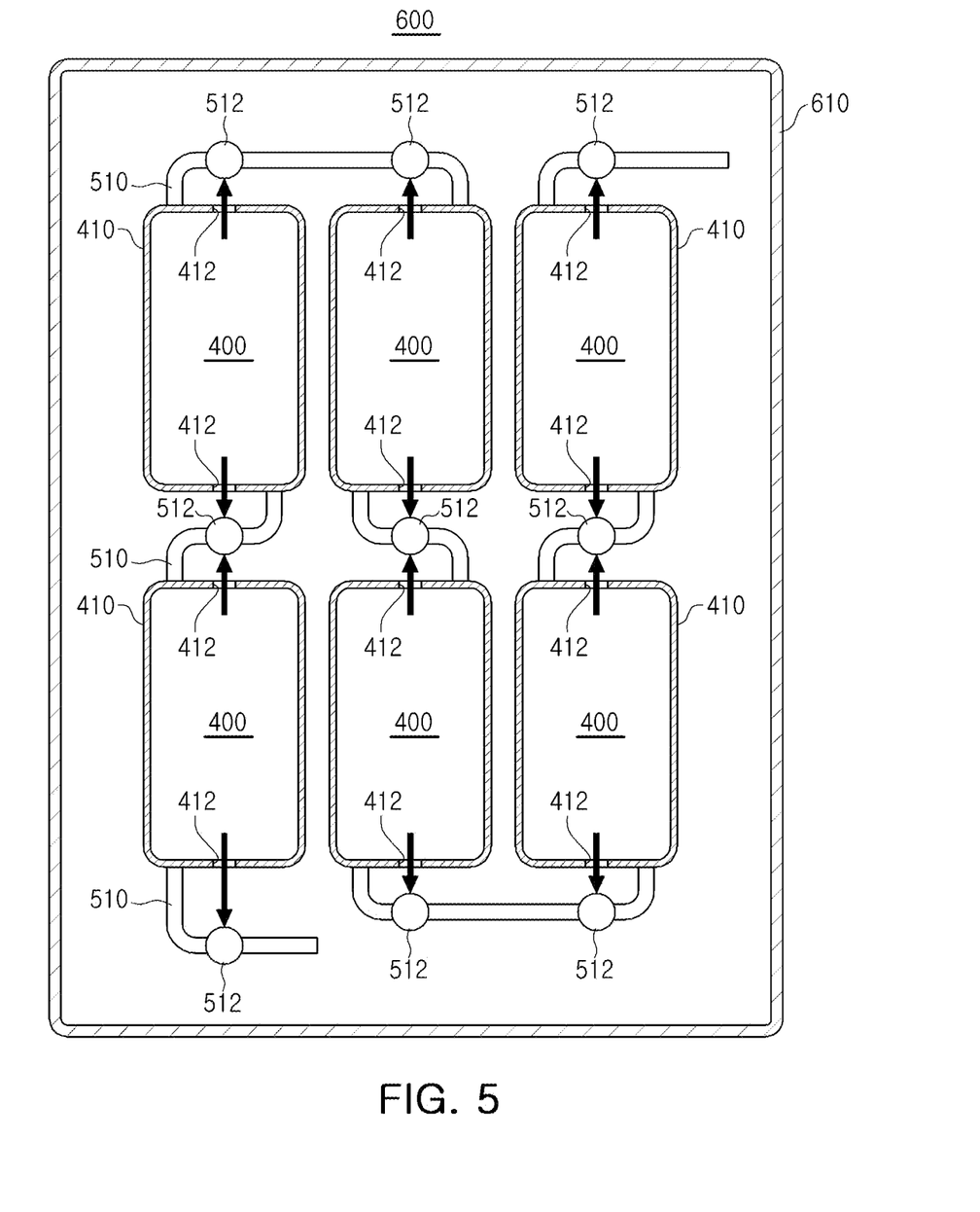
FIG. 5 is a diagram illustrating an electrical connection between battery modules provided in a battery pack according to an embodiment of the present invention.

FIG. 5 illustrates an electrical connection between a plurality of battery modules 400 provided in a battery pack 600 according to an embodiment of the present invention.

Referring to FIG. 5, in an embodiment, the battery pack 600 may include the plurality of battery modules 400 inside a pack housing 610. The plurality of battery modules 400 are electrically connected to each other by busbars 510.

In an embodiment, each of the battery modules 400 may include vent holes 412 facing the busbar 510 connected to an adjacent battery module. One battery module 400 may include two busbars 510 respectively connected to an anode and a cathode and extending to an adjacent battery module. The battery module 400 may include vent holes 412 in a case 410 that are opened toward a portion of the busbars 510.

In an embodiment, when thermal runaway occurs in one battery module 400, the busbar 510 facing the vent hole 412 may be cut as the venting gas G is emitted through the vent hole 412. Accordingly, an electrical connection between the battery module 400 and the adjacent battery module is cut off.

In an embodiment, the busbar 510 may include a disconnecting portion 512 in a portion corresponding to the vent hole 412. The disconnecting portion 512 may have a structure that is more vulnerable to high temperature, high pressure, or impact than other portions. The disconnecting portion 512 may be provided, for example, in the same form as in the examples of FIGS. 3A-3E or FIG. 4.

The case 410 of the battery module 400 and the housing 610 of the battery pack 600 are generally made of a conductive metal. Therefore, for insulation between the battery module 400 and the battery pack 600, a plastic member or the like is provided therebetween. However, if a specific battery module 400 is triggered to cause thermal runaway, the components responsible for insulation between the battery module 400 and the pack housing 610 may be damaged, so that the battery module 400 and the pack housing 610 may be energized. Accordingly, an overcurrent may flow in the battery module 400, and heat transfer to an adjacent battery module 400 may also lead to ignition of the entire battery pack 600.

According to an embodiment, even if thermal runaway occurs in a specific battery module 400, the gas G discharged from the vent hole 412 can break or fracture the busbar 510, thereby blocking electrical connection with the adjacent battery module. Accordingly, heat transfer to an adjacent battery module may be prevented, and stability and reliability of the battery module 400 and the battery pack 600 may be secured.

Figure 6:
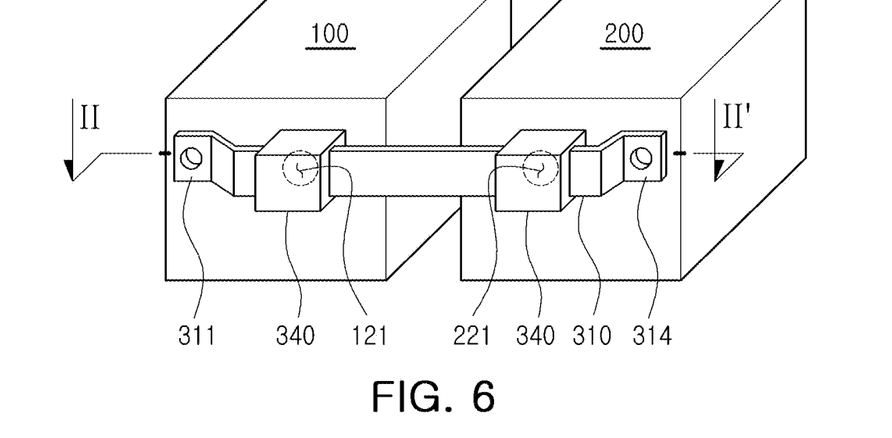
FIG. 6 illustrates a connection structure between two battery modules according to an embodiment of the present invention.
Figure 7:
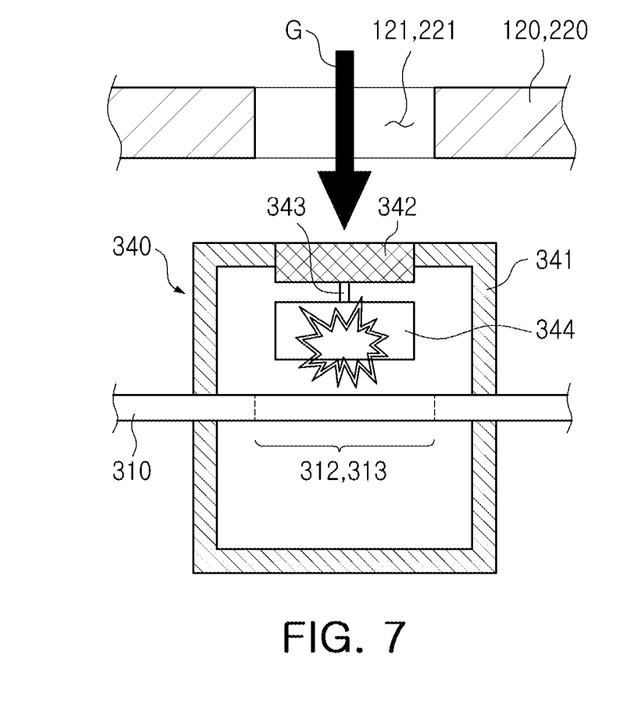
FIG. 7 is a cross-sectional view of the connection structure of FIG. 6 along line II-II' of FIG. 6.

FIG. 6 illustrates a connection structure between two battery modules 100 and 200 according to an embodiment. FIG. 7 is a cross-sectional view of the connection structure of FIG. 6 along line II-II' of FIG. 6.

Referring to FIGS. 6 and 7, the battery module 100 may be connected to the adjacent battery module 200 through a busbar 310. In the illustrated embodiment of FIG. 6, at least two initiating devices 340 may be mounted on a portion of the busbar 310.

The battery modules 100 and 200 may include vent holes 121 and 221, and the vent holes 121 and 221 may be provided at a position corresponding to the at least two initiating devices 340 provided in the busbar 310. For example, the vent holes 121 and 221 may be opened toward the at least two initiating devices 340.

In an embodiment, the initiating device 340 may include a case 341, a trigger device 342, and an initiator 344. In an embodiment, the trigger device 342 may be configured to detect a venting gas G to detonate the initiator 344. A wiring 343 for transmitting a signal may be provided between the trigger device 342 and the initiator 344.

In an embodiment, the initiating device 340 may be provided such that the venting gas G which is ejected from the vent holes 121 and 221 is directed toward the trigger device 342 of the corresponding initiating device 340. For example, the vent holes 121 and 221 of the battery modules 100 and 200 may be opened toward the trigger device 342. Alternatively, the trigger device 342 and the vent holes 121 and 221 may be provided to face each other.

In another embodiment, the trigger device 342 may be omitted in the initiating device 340. For example, the venting gas G may be directly ejected toward the initiator 344 inside the case 341, and the initiator 344 may rupture.

In an embodiment, the venting gas G discharged from the vent holes 121 and 221 may primarily rupture the initiator 344 inside the initiating device 340, and the busbar 310 due to the explosion of the initiator 344 may break. The venting gas G coming out of the vent holes 121 and 221 may not be sufficient to break the busbar 310, and the initiator 344 bursting inside the case 341 may apply a relatively large impact to the busbar 310 compared to the venting gas G.

In an embodiment, the disconnecting portions 312 and 313 in the busbar 310 may be disposed adjacent to the initiator 344 of the initiating device 340. The disconnecting portions 312 and 313 may be provided in one of various shapes illustrated in FIGS. 3A-3E or FIG. 4. For example, the disconnecting portions 312 and 313 may be provided to have lower structural rigidity than other portions, so that the disconnecting portions 312 and 313 may be provided to be relatively easily broken due to the explosion of the initiator 344. For another example, the disconnecting portions 312 and 313 may be provided in a form of a switch to release an electrical connection between both ends of the busbar 310 due to the explosion of the initiator 344.

The embodiments described in FIGS. 6 to 7 may be similarly applied to the battery module 400 and the busbar 510 included in the battery pack 600 illustrated in FIG. 5. For example, the initiating device 340 of FIG. 6 may be mounted on the disconnecting portion 512 of the busbar 510.

As set forth above, according to an embodiment of the present disclosure, in a thermal runway situation, an electrical connection between battery modules is released or broken to prevent heat transfer between the battery modules, and stability and reliability of the battery module can be secured.

In the thermal runway situation of the battery module, by breaking, or releasing the electrical connection connected to positive and cathodes on both sides, it is possible to prevent, suppress/delay, heat transfer from the battery module to the adjacent battery module.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

While example embodiments have been shown and described above, it will be apparent to those skilled in the art that modifications and variations could be made without departing from the scope of the present inventive concept as defined by the appended claims.

What is claimed is:

1. A battery pack, comprising:
a plurality of battery modules including a first battery module and a second battery module; and
a busbar electrically connecting the first battery module and the second battery module,
wherein the busbar comprises a disconnecting portion in a portion facing a first vent hole and a second vent hole,
wherein the first battery module includes a first battery case in which a plurality of battery cells are provided, the first battery case includes the first vent hole so that gas is ejected toward the disconnecting portion,
wherein the second battery module includes a second battery case in which a plurality of battery cells are provided, the second battery case includes the second vent hole so that gas is ejected toward the disconnecting portion, and
wherein a direction of ejected gas from the first vent hole is different with a direction of ejected gas from the second vent hole.

2. The battery pack of claim 1, wherein the disconnecting portion has a cross-sectional area smaller than that of another portion of the busbar.

3. The battery pack of claim 1, wherein the disconnecting portion is configured to have an electric resistance greater than that of another portion of the busbar.

4. The battery pack of claim 1, wherein the disconnecting portion is configured to have lower structural rigidity than other portions of the busbar.

5. The battery pack of claim 4, wherein the disconnecting portion comprises a plurality of bridges connecting both ends of the disconnecting portion to the busbar.

6. The battery pack of claim 1, wherein the disconnecting portion further includes a deformation portion configured to selectively connect at least one end of the busbar by being deformed by gas ejected from the first or second vent hole.

7. The battery pack of claim 6, wherein the busbar comprises a first portion connected to the first battery module, and a second portion connected to the second battery module, and one end of the deformation portion is fixedly provided to the first portion, and the other end of the deformation portion is selectively connected to the second portion by the gas ejected from the first vent hole.

8. The battery pack of claim 6, wherein the deformation portion comprise a bimetal.

9. The battery pack of claim 1, further comprising an initiator mounted on a portion of the busbar and configured to break the busbar in response to the gas ejected from the first or second vent hole.

10. The battery pack of claim 9, further comprising a trigger device positioned opposite to the first and second vent holes, and configured to detect the gas ejected from the first or second vent hole to rupture the initiator.

11. The battery pack of claim 9, wherein the disconnecting portion is located close to the initiator, the disconnecting portion includes a portion having lower structural rigidity than other portions of the busbar.

12. The battery pack of claim 9, further comprising a case for accommodating a portion of the initiator and the busbar.

* * * * *